(12) United States Patent
Oyama

(10) Patent No.: US 6,247,765 B1
(45) Date of Patent: *Jun. 19, 2001

(54) METHOD AND APPARATUS FOR CONTROLLING FLUID PRESSURE

(75) Inventor: Hitoshi Oyama, Itami (JP)

(73) Assignee: Sumitomo Electric Industries, Ltd., Hyogo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,080

(22) Filed: Sep. 15, 1998

(30) Foreign Application Priority Data

Sep. 16, 1997 (JP) .................................................... 9-250768
Aug. 19, 1998 (JP) .................................................. 10-233030

(51) Int. Cl.⁷ .................................. B60T 7/00; B60T 8/32
(52) U.S. Cl. ................................... 303/119.2; 137/625.65; 251/129.08; 303/117.1
(58) Field of Search ............................. 303/119.1, 119.2, 303/119.3, 117.1, 113.1, 155; 137/625.65; 251/129.08

(56) References Cited

U.S. PATENT DOCUMENTS

| | | | |
|---|---|---|---|
| 4,662,605 | * 5/1987 | Garcia | 251/129.08 |
| 5,439,277 | * 8/1995 | Higashi | 303/113.1 |
| 5,445,446 | * 8/1995 | Yamamuro | 303/117.1 |
| 5,495,869 | 3/1996 | Hashida | 137/501 |
| 5,538,336 | * 7/1996 | Reuter et al. | 303/119.2 |
| 5,579,807 | * 12/1996 | Kohler | 137/625.65 |
| 5,636,908 | * 6/1997 | Yamamuro | 303/117.1 |
| 5,638,861 | 6/1997 | Hashida | 137/501 |
| 5,778,932 | * 7/1998 | Alexander | 137/625.65 |
| 5,921,840 | * 7/1999 | Mortimer et al. | 303/125 |

FOREIGN PATENT DOCUMENTS

| | | |
|---|---|---|
| 3347473 | 7/1985 | (DE) . |
| 3835642 | 5/1989 | (DE) . |
| 3911531 | 7/1990 | (DE) . |
| 693408 | 1/1996 | (EP) . |
| 1261581 | 10/1989 | (JP) . |
| 3069877 | 3/1991 | (JP) . |
| 6221452 | 8/1994 | (JP) . |
| 10318421 | 12/1998 | (JP) . |

OTHER PUBLICATIONS

An English Language abstract of JP 3–069877.
An English Language abstract of JP 1–261581.
An English abstract of JP 6–221452
Japanese (abstract) Patent No. JP 06221452 to Sumitomo Electric Ind., Ltd., which was published on Aug. 9, 1994.
Japanese (abstract) Patent No. JP 01261581 to Kayaba Ind., Co., Ltd., which wass pu blished on Oct. 18, 1989.
Japanese (abstract) Patent No. JP 03069877 to Toyoda Mach Works Ltd., which was published on Mar. 26, 1991.

* cited by examiner

*Primary Examiner*—Matthew C. Graham
(74) *Attorney, Agent, or Firm*—Greenblum & Bernstein, P.L.C.

(57) ABSTRACT

In controlling the fluid pressure applied to a load using a proportional fluid pressure control valve or a flow control valve, responsiveness of control is improved in a pressure region where the consumption of fluid is larger than in other regions. In this method, if there is a pressure region where the consumption of fluid is greater than in other regions, overshoot control is carried out to increase fluid pressure in such a pressure region by adding a predetermined pressure to a target pressure for a predetermined time, or undershoot control is carried out to reduce fluid pressure in such a pressure region by subtracting a predetermined pressure from a target pressure for a predetermined time. It is thus possible to increase and reduce fluid pressure quickly to a target pressure even in a pressure region where the consumption of fluid is large.

6 Claims, 11 Drawing Sheets

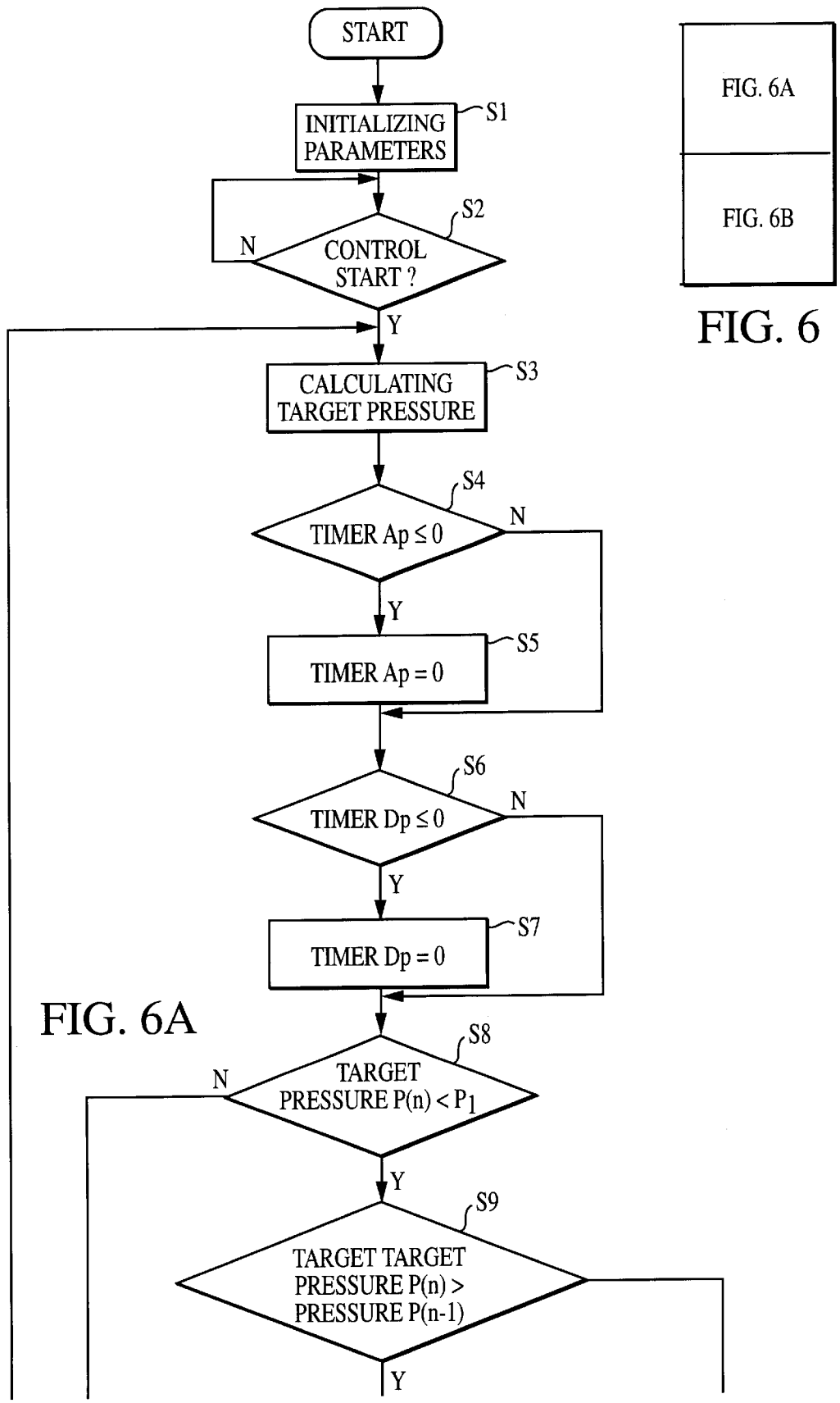

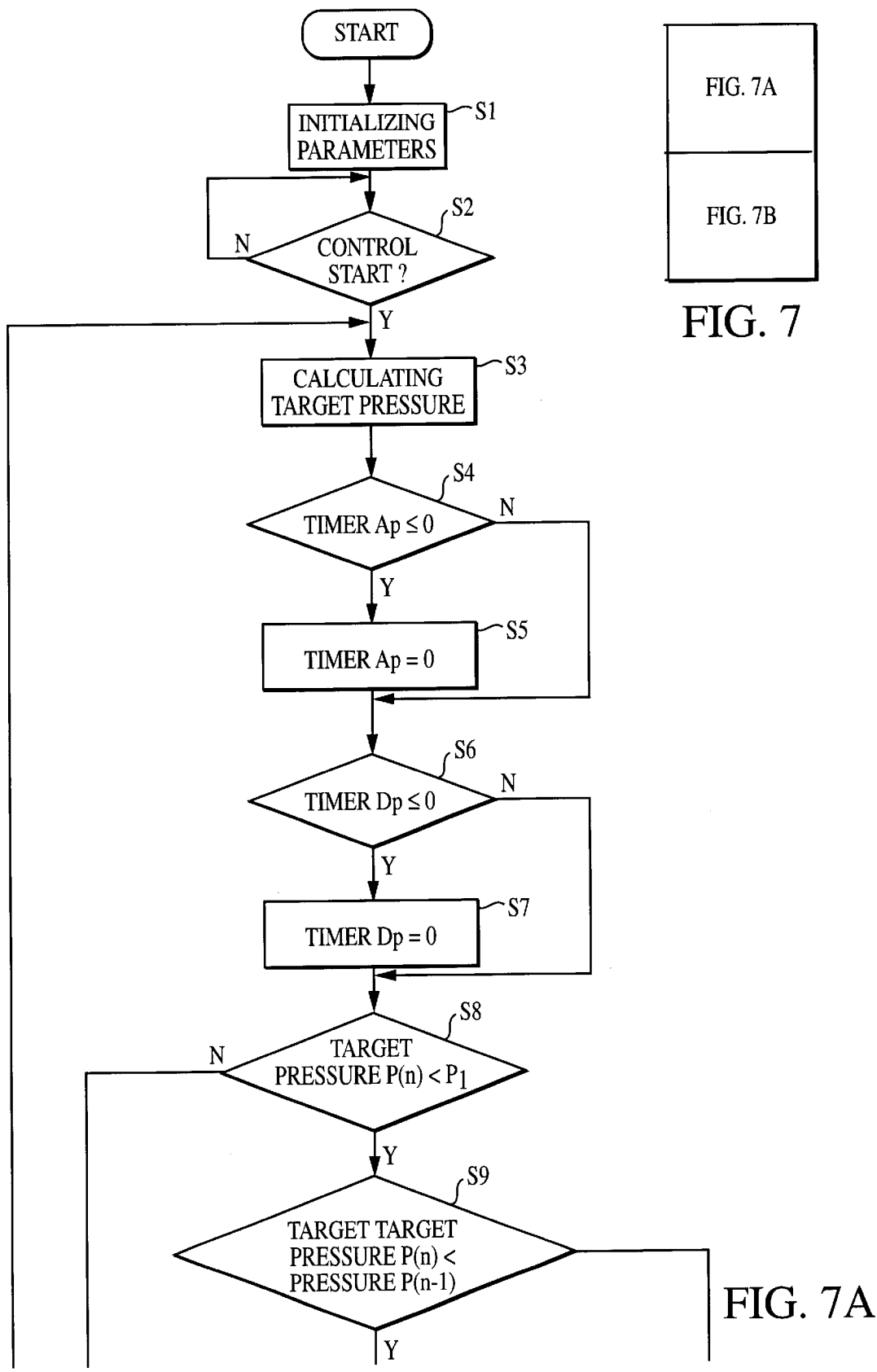

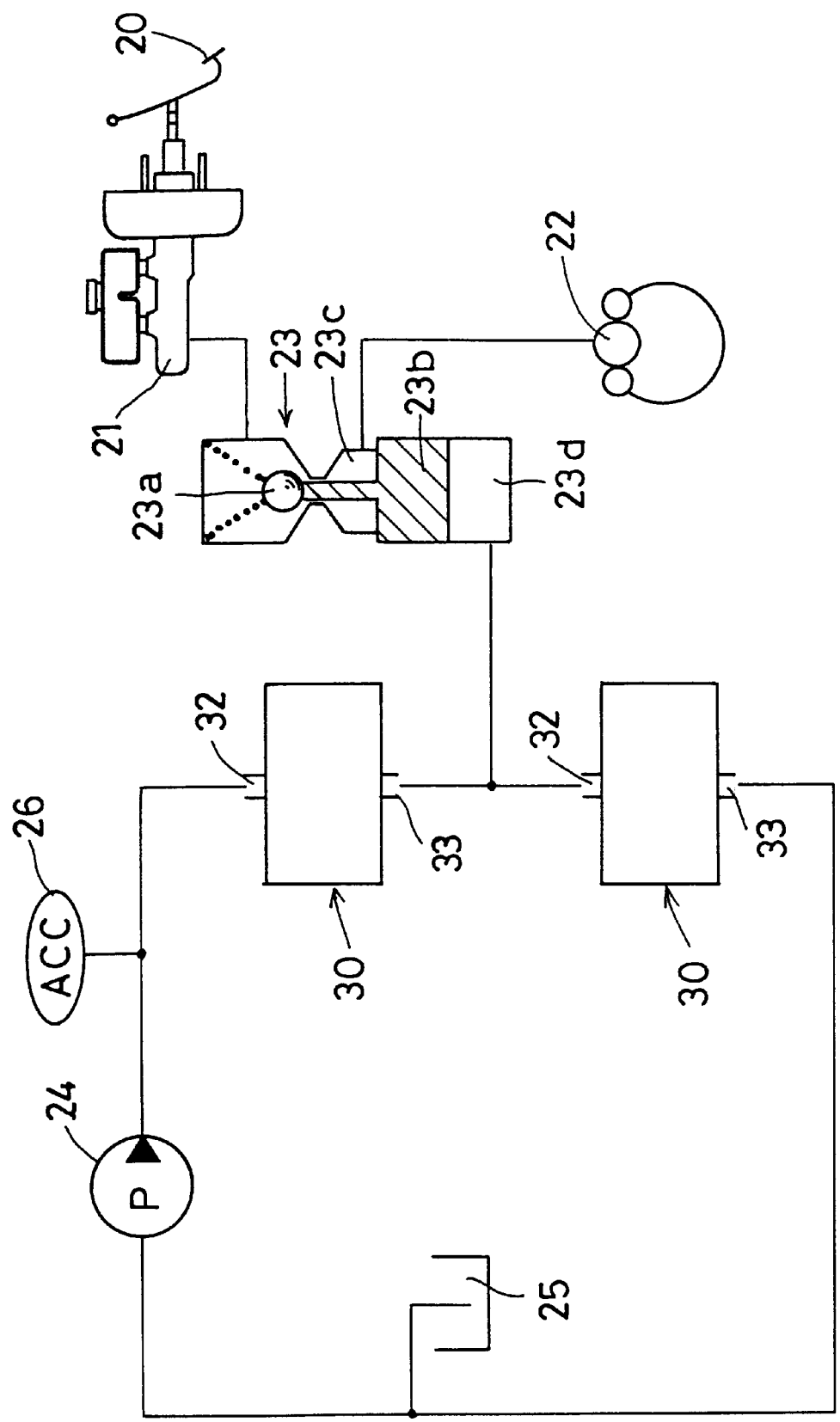

PRIOR ART

METHOD AND APPARATUS FOR CONTROLLING FLUID PRESSURE

BACKGROUND OF THE INVENTION

This invention relates to a method of controlling fluid pressure on a load that is effective when e.g. automotive brake fluid pressure is controlled using a proportional pressure control valve or a flow-control valve.

From unexamined Japanese patent publications 1-261581 and 3-69877 and unexamined Japanese utility model publication 1-261581, as well as Japanese patent applications 9-133450 and 9-21611 filed by the applicant of this invention, proportional pressure control valves are known which have a drive means capable of electrically controlling the output and adapted to control the fluid pressure on the load to a value corresponding to the driving force of the drive means by moving a spool by the drive means to a position corresponding to the driving force of the drive means.

This type of proportional pressure control valves includes a housing having a first port connected to a fluid pressure source, a second port connected to a load, and a third port connected to a reservoir, a spool mounted in the housing, a first valve portion for opening and cutting off communication between the first and second ports depending on the position of the spool, and a second valve portion for opening and cutting off communication between the second and third ports.

Specifically, when the spool is moved to a point where the driving force of the drive means balances with a thrust produced by receiving in opposite directions the pressure at the second port on pressure receiving portions having different areas, the state of communication of the second port with the first or third port is changed over, and the degree of opening of the first or second valve portion is adjusted so that the pressure at the second port is controlled to a value corresponding to the driving force of the drive means.

FIG. 1 shows fluid pressure-fluid amount characteristics. As shown, automotive brakes consume a greater amount of brake fluid in a low-pressure region.

Thus, if a proportional pressure control valve of the above-described type is used to control automotive brake fluid pressure, control responsiveness worsens in the low-pressure region.

As shown in FIG. 2, in a region where a lesser amount of brake fluid is consumed (region where the pressure is higher than P1), pressure rise or fall per unit fluid amount is great, that is, the pressure rises and falls sharply. The actual pressure P thus approaches the target pressure P(n) quickly. But in a region where a large amount of brake fluid is consumed (region where the pressure is lower than P1), pressure rise or fall per unit fluid amount is small, that is, the pressure rises or falls only slowly. It thus takes a long time for the actual pressure P to reach the target pressure P(n). Responsiveness of control is thus no good.

Automotive brake systems have been sophisticated year after year. Some recent brake systems include not only an ABS (antilock brake control system) but a TCS (traction control system) and an ASC (active safety control) system. Such systems require high-precision control even in the low-pressure region.

An object of this invention is to improve responsiveness of control in such a low-pressure region.

SUMMARY OF THE INVENTION

According to this invention, there is provided a method of controlling a fluid pressure applied to a load wherein in controlling the fluid pressure applied to the load using a proportional pressure control valve of the above-described type, if, in a control fluid pressure range, there is a pressure region where the consumption of fluid is greater than in other regions, overshoot control is carried out to increase fluid pressure in the pressure region by adding a predetermined pressure to a target pressure for a predetermined time, and undershoot control is carried out to reduce fluid pressure in the pressure region by subtracting a predetermined pressure from a target pressure for a predetermined time.

Preferably, the system has both the functions of overshoot control during a pressure increase phase and undershoot control during a pressure reduction phase. But a system having only one of these functions would be advantageous.

Such accurate fluid pressure control may be carried out using flow control valves as disclosed in unexamined Japanese patent publication 6-221452. Such flow control valves comprise a housing having an inlet port and an outlet port, and a spool substantially liquid-tightly and slidably mounted in the housing so as to define first and second fluid pressure chambers at one and the other ends of the spool, a driving means for biasing the spool, the first and second fluid pressure chambers applying fluid pressure on the one and other ends of the spool and communicating with each other through a fluid passage having an orifice, a valve portion comprising a shoulder portion formed on the inner periphery of the housing and a shoulder portion formed on the outer periphery of the spool, the shoulder portions being movable into and out of sliding contact with each other to form and stop a fluid flow from the inlet port to the outlet port through the orifice, wherein the spool moves to a balancing point where a thrust applied to the spool due to a difference in pressure between the first and second fluid pressure chambers balances with the force of the drive means which is opposite in direction to the thrust, and fluid flows through the orifice toward the outlet port at a rate determined by the difference in fluid pressure and the sectional area of the orifice, whereby when a thrust applied to the spool due to a difference in pressure between the first and second fluid pressure chambers by an automatic opening degree adjusting function of the valve portion according to the position of the spool balances with the force of a drive means which is opposite in direction to the thrust, fluid flows through the orifice toward the outlet port at a rate determined by the difference in fluid pressure and the sectional area of the orifice. If two such flow control valves are used with the load connected to a fluid pressure source through one of the two flow control valves and to a reservoir through the other fluid flow control valve, to control the fluid pressure applied to the load, the same problems as mentioned above can occur. Thus, in this case, too, overshoot or undershoot control is carried out to improve responsiveness.

FIG. 3 shows the method of controlling the fluid pressure on the load by means of a proportional pressure control valve according to this invention.

First, an electronic control unit determines whether the target pressure P(n) is in a region where overshooting or undershooting control is needed (or whether P(n) is lower than P1). If the ECU determines such control is necessary, it adds, for pressure increase control, a predetermined pressure addP, to the target pressure P(n) for a predetermined time T1 to control the proportional pressure control valve so as to achieve the new target pressure P(n) plus addp, and subtracts, for pressure reduction control, the predetermined pressure addP from the target pressure for a predetermined time T2 to control the proportional pressure control valve so as to achieve the new target pressure P(n) minus addP. With this arrangement, the valve portions are opened to a greater degree than with conventional control arrangements both during pressure increase and pressure reduction. Thus, the actual pressure P rises and falls quickly, improving the responsiveness of control in the low-pressure region.

Other features and objects of the present invention will become apparent from the following description made with reference to the accompanying drawings, in which:

BRIEF DESCRIPTION OF THE DRAWINGS

FIG. 5, comprising

FIG. 6, comprising FIGS. 6A and 6B, is a flowchart showing a control pattern for overshoot control only during pressure increase phase;

FIG. 7, comprising FIGS. 7A and 7B, is a flowchart showing a control pattern for undershoot control only during pressure reduction phase;

FIG. 8 is a view of an automotive brake system including flow control valves.

DETAILED DESCRIPTION OF THE PREFERRED EMBODIMENT

Figure 4:
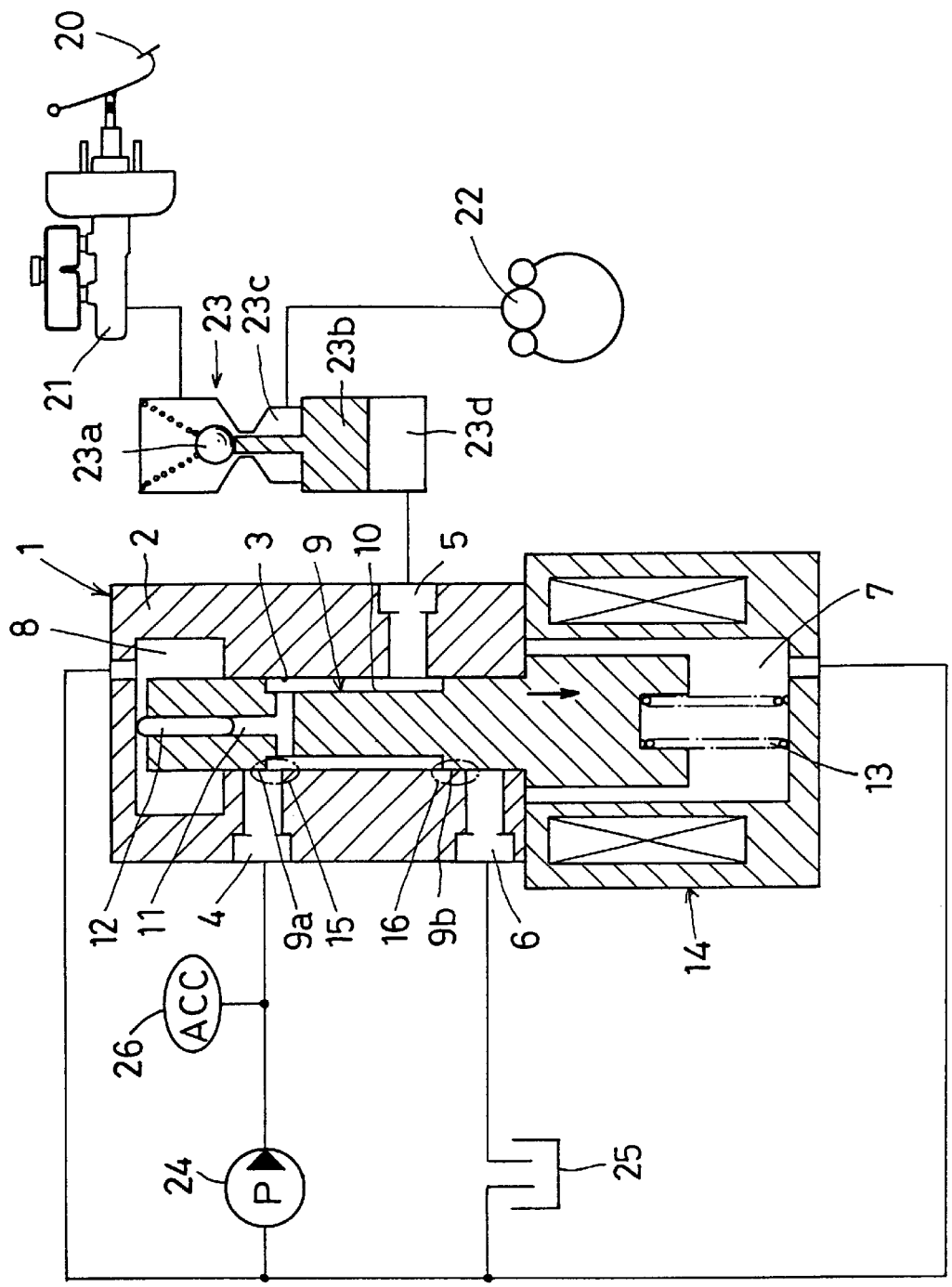
FIG. 4 is a view showing an automotive brake system including a proportional pressure control valve.

FIG. 4 shows a proportional pressure control valve and an automotive brake system (ABS) using it. For simplicity, only one wheel brake 22 is shown.

The proportional pressure control valve, generally designated by numeral 1, comprises a housing 2, a spool 9, a reaction force pin 12 inserted in one end of the spool 9, a spool-biasing spring 13, and an electromagnet 14 for biasing the spool 9 in a direction opposite to the direction in which the spool is biased by the spring 13.

The housing 2 has a spool guide hole 3 in which is substantially liquid-tightly and slidably inserted the spool 9, first to third ports 4–6 having one end thereof open to the guide hole 3 at three positions, and first and second fluid chambers 7 and 8 into which one and the other ends of the spool 9 protrude, respectively.

The spool 9 has a surface passage 10, and an inner passage 11 communicating with the second port 5 at all times. The reaction force pin 12 is substantially liquid-tightly inserted in the end of the inner passage 11 open to the second fluid chamber 8. Thus, a difference equal to the sectional area of the reaction force pin 12 is created between the area that receives fluid pressure biasing the spool 9 toward the first fluid chamber 7 and the area that receives fluid pressure biasing the spool toward the second fluid chamber 8. The spool 9 is thus biased downwardly in the figure by a thrust which is this area difference multiplied by the pressure at the second port 5.

Formed between the first port 4 and a land portion 9a formed on the outer periphery of the spool 9 is a first valve portion 15 for opening and cutting off communication between the first port 4 and second port 5 depending on the position of the spool 9. Between the third port 6 and a land 9b on the outer periphery of the spool 9, a second valve portion 16 is formed which opens and cut off communication between the second port 5 and third port 6 depending upon the spool position. The degrees of opening of the first and second valve portions 15, 16 change with the spool position.

During a non-control mode in which the electromagnet 14 is deactivated, the spool 9 is held in the position shown in FIG. 4 by the force of the spring 13. In this state, the first valve portion 15 is open, so that fluid flows from the first port 4 to the second port 5.

When the electromagnet 14 is activated, the spool 9 is pulled downwardly in the figure by the electromagnetic force until the downward biasing force balances with the upward force.

When the forces balance with each other, the following relation (1) is met. While the first valve portion 15 is open, the pressure at the second port 5 and the amount of movement of the spool 9 increase as the energizing current I increases. After the first valve portion 15 has been closed, when the current I increases to a certain point, the second valve portion 16 opens, thus opening communication between the second port 5 and the third port 6. The pressure at the second port 5 thus drops.

$$F_{pr}+F_{sol}= \qquad (1)$$

$F_{sp}$: Force of spring 13
$F_{sol}$: Driving force by electronmagnet 14

$F_{pr}$: Thrust by fluid pressure
$F_{pr}$: in the above formula is given by:

$$(P2-P3)\cdot S$$

where P2 is the pressure at the second port 5 (fluid pressure on the load), P3 is the reservoir pressure, and S is the sectional area of the reaction force pin 12. $F_{sol}$ is given by $b\cdot I^2$ (b is a constant). Thus, the following relation is met:

$$(P2-P3)\cdot S + b\cdot I^2 = F_{sp} \qquad (2)$$
$$\therefore P2 = (F_{sp} - b\cdot I^2)/S + P3$$

Since Fsp, b, S and P3 in the formula (2) are all constants, P2 is a function of the current I.

The ABS of FIG. 4 has a shutoff valve 23 disposed between the master cylinder 21 and the wheel brake 22. The proportional pressure control valve 1 has its second port 5 connected to a second fluid chamber 23d of the shutoff valve 23, its first port 4 to a pump 24, and its third port 6, first fluid chamber 7 and second fluid chamber 8 to a reservoir 25. The ABS further includes sensors (not shown) necessary for antilock control, and an electronic control unit (not shown either) for controlling the proportional pressure control valve 1 and the pump 24 based on the signal from sensor.

In this brake system, during a normal control mode, the valve body 23a of the shutoff valve 23 is moved by the piston 23b under the pressure of an accumulator 26 provided in the discharge circuit of the pump 24 to its open position, so that brake fluid can freely flow between the master cylinder 21 and the wheel brake 22.

If the electronic control unit detects any lockup tendency of the wheel while the brake pedal 20 is being depressed, it will give a pressure reduction command, upon which the electromagnet 14 of the proportional pressure control valve 1 is energized to pull the spool 9. The first valve portion 15 thus closes and the second valve portion 16 opens. This reduces the pressure in the second fluid chamber 23d of the shutoff valve 23, thus moving the piston 23d downward in the figure. The shutoff valve 23 thus closes. With the downward movement of the piston 23b, the volume of the first fluid chamber 23c increases, thus reducing the pressure in the wheel brake 22.

When the electronic control unit detects that the wheel lockup tendency has disappeared, it produces a pressure reincrease command. In response, the spool driving force by the electromagnet 14 will lessen, thus letting the spool 9 move upward in the figure to close the second valve portion 16 and open the first valve portion 15. Fluid pressure from the pump 24 is thus introduced into the second fluid chamber 23d through the second port 5, so that the volume of the first fluid chamber 23c is thus reduced by the piston 23b. Thus, the pressure in the wheel brake 22 reincreases. Such pressure increase and reduction are repeated until the vehicle stops, by moving the piston 23b to increase and reduce the volume of the first fluid chamber 23c.

In this brake system, if antilock control is carried out in the low-pressure region where the fluid consumption is large due e.g. to a slippery road surface, responsiveness of control will deteriorate compared with other pressure regions. According to this invention, to improve responsiveness in the low-pressure region, the brake system is controlled in the following manner.

Figure 5A:
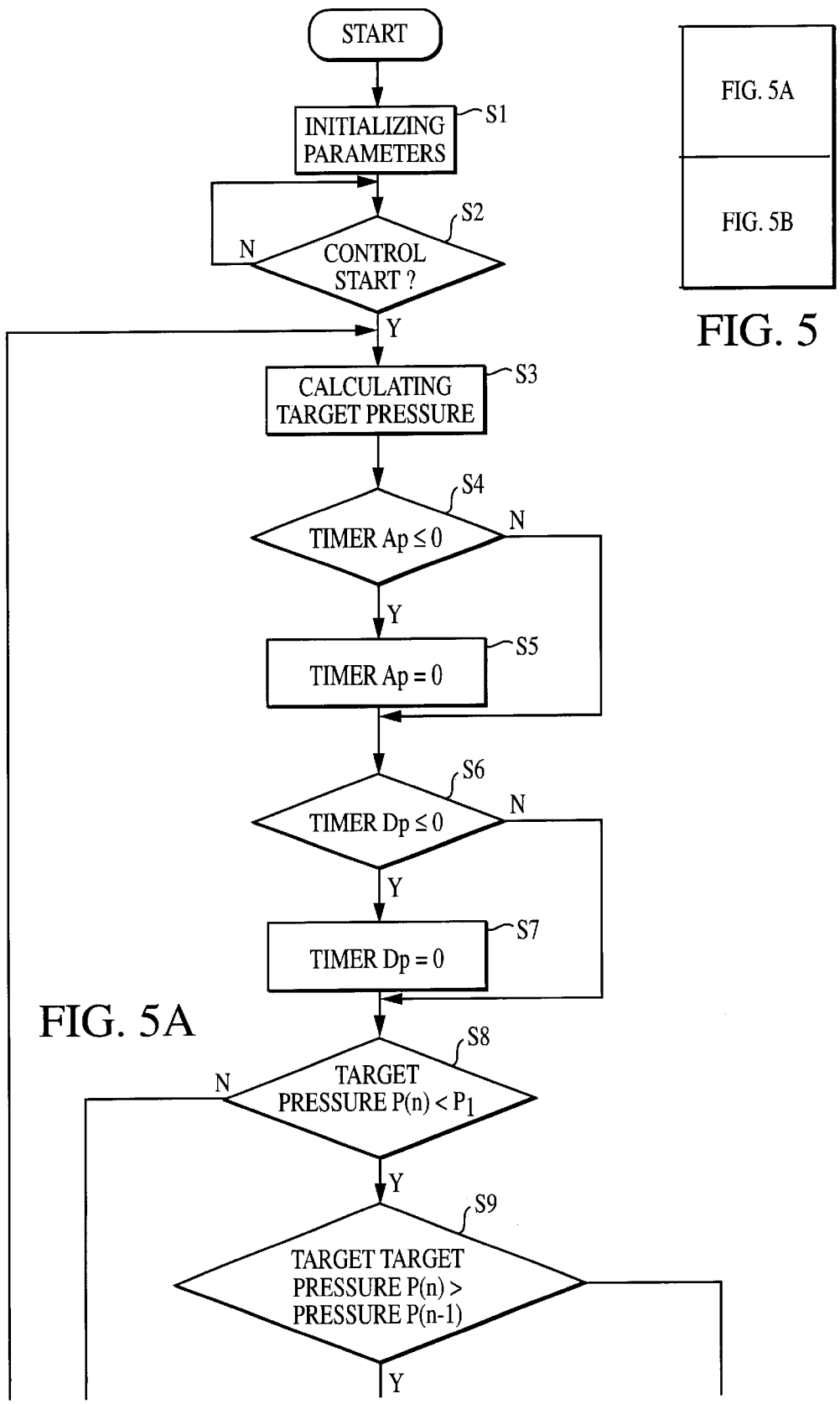
FIGS. 5A and 5B, is a flowchart showing a control pattern of the method according to this invention.
Figure 5B:
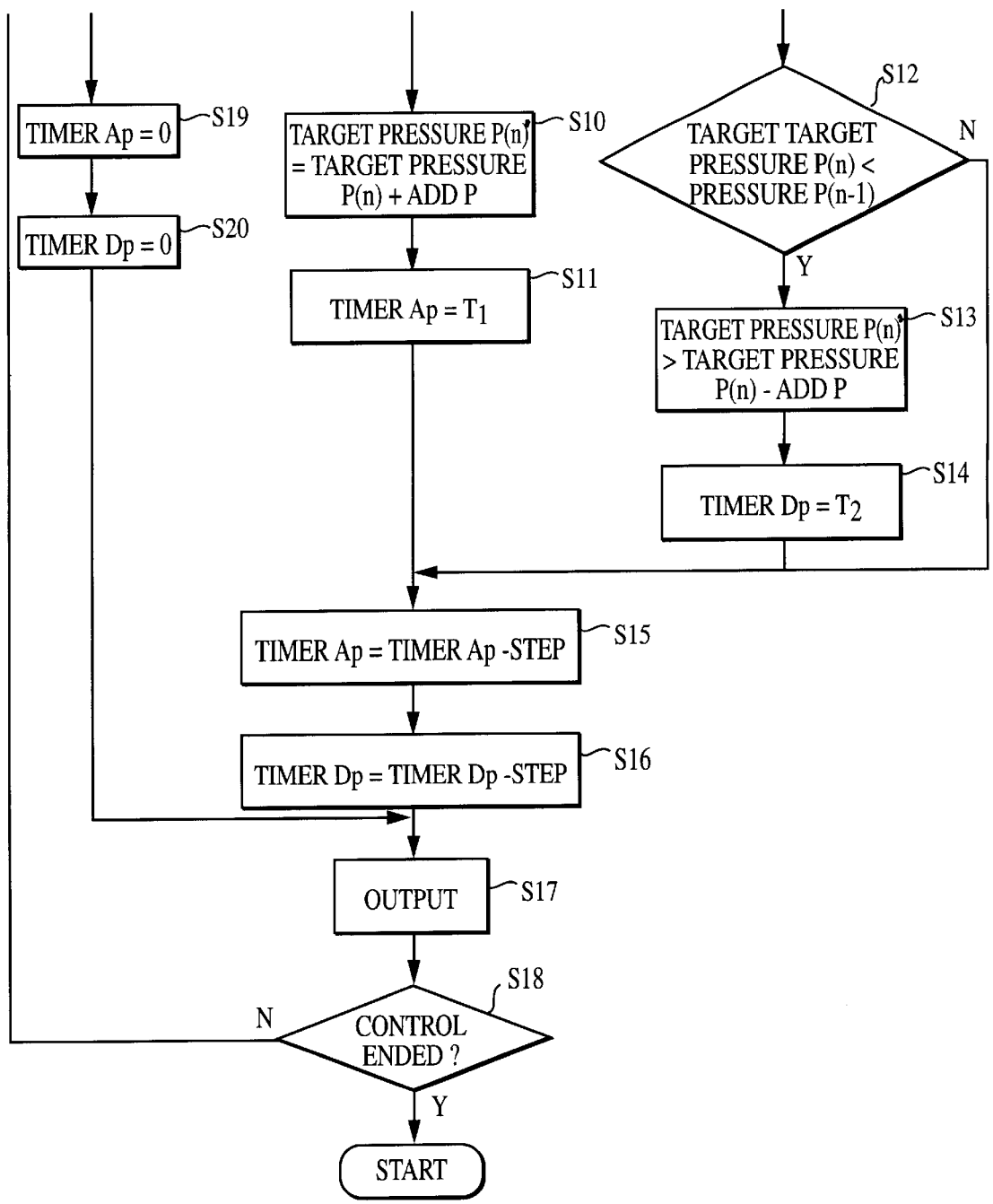

FIG. 5 shows one example of control algorisum according to the method of this invention.

In the following description, Step 1 to Step 20 are abbreviated to S1 to S20.

Upon start, parameters are initialized (S1). Then, ECU asks if it is necessary to start control (S2). If the answer is yes, ECU calculates a target pressure P(n) for the control (S3), resets a timer Ap for overshoot control and a timer Dp for undershoot control in S4–S7, and compares the target pressure P(n) with a reference pressure P1 inputted beforehand in S8 to determine if overshoot or undershoot control is needed. If the answer is yes, ECU then asks which control is needed, pressure increase or pressure reduction control in S9. If pressure increase control is needed, ECU adds a predetermined pressure addP for overshoot control to the target pressure P(n) to set a new target pressure P(n)' to be used in the actual control in S10, activates the timer Ap for overshoot control in S11, advances the thus activated timer Ap by one cycle in S15, and controls the current supplied through the electromagnet of the proportional pressure control valve to such a value that the target pressure P(n)' is achievable, for overshoot pressure control.

If the answer in S9 is negative, ECU asks if pressure reduction is needed in S12. If yes, ECU subtracts a predetermined pressure addP for undershoot control from the target pressure P(n) to set a new target pressure P(n)" in S13, activates the timer Dp for undershoot control in S14, advances the thus activated timer Dp by one cycle in S16, and controls the current supplied through the electromagnet to such a value that the target pressure P(n)" is achievable, for undershoot pressure control, during the period $T_2$.

Then, ECU asks if the control has ended in S18. If the answer is yes, the program returns to START. If no, the program returns to S3.

If no is the answer in S12, this means that neither pressure increase nor pressure reduction control is necessary. In this case, the program proceeds to S15. If the actual pressure has gotten out of the pressure region to be controlled, the program proceeds to S17 after resetting the timers Ap and Dp in S19 and S20.

Figure 1:
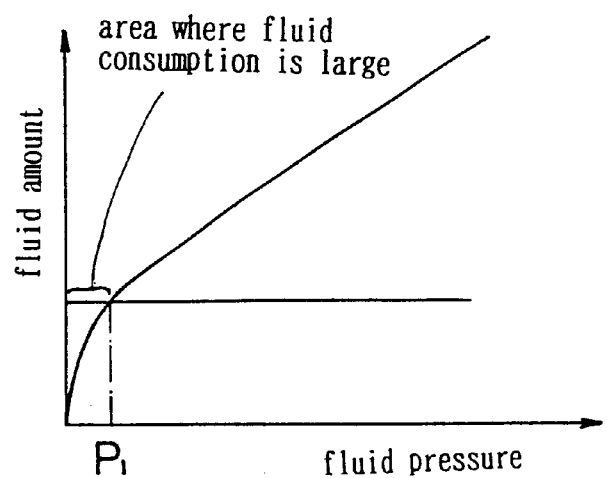
FIG. 1 is a graph showing the relationship between the fluid pressure and the fluid amount in an automotive brake.
Figure 2:
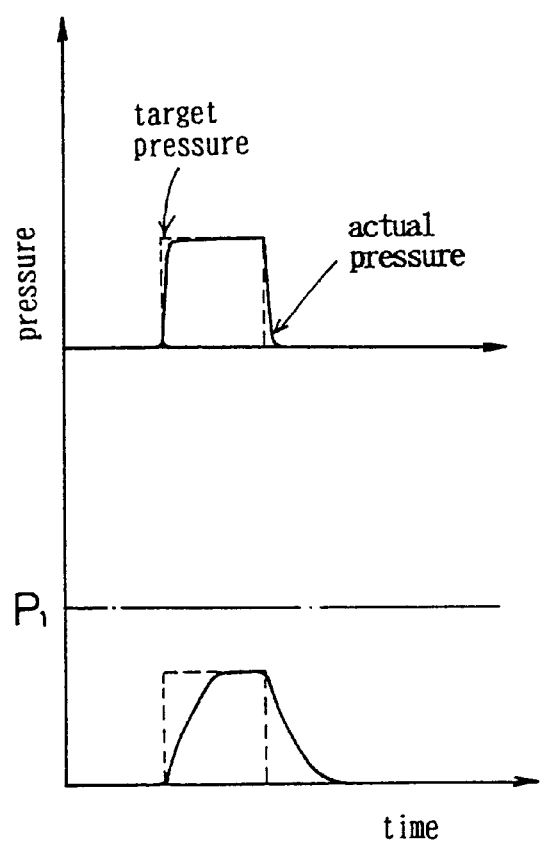
FIG. 2 is a graph showing the responsiveness of control in a region where the consumption of fluid is great and a region where it is smaller.
Figure 3:
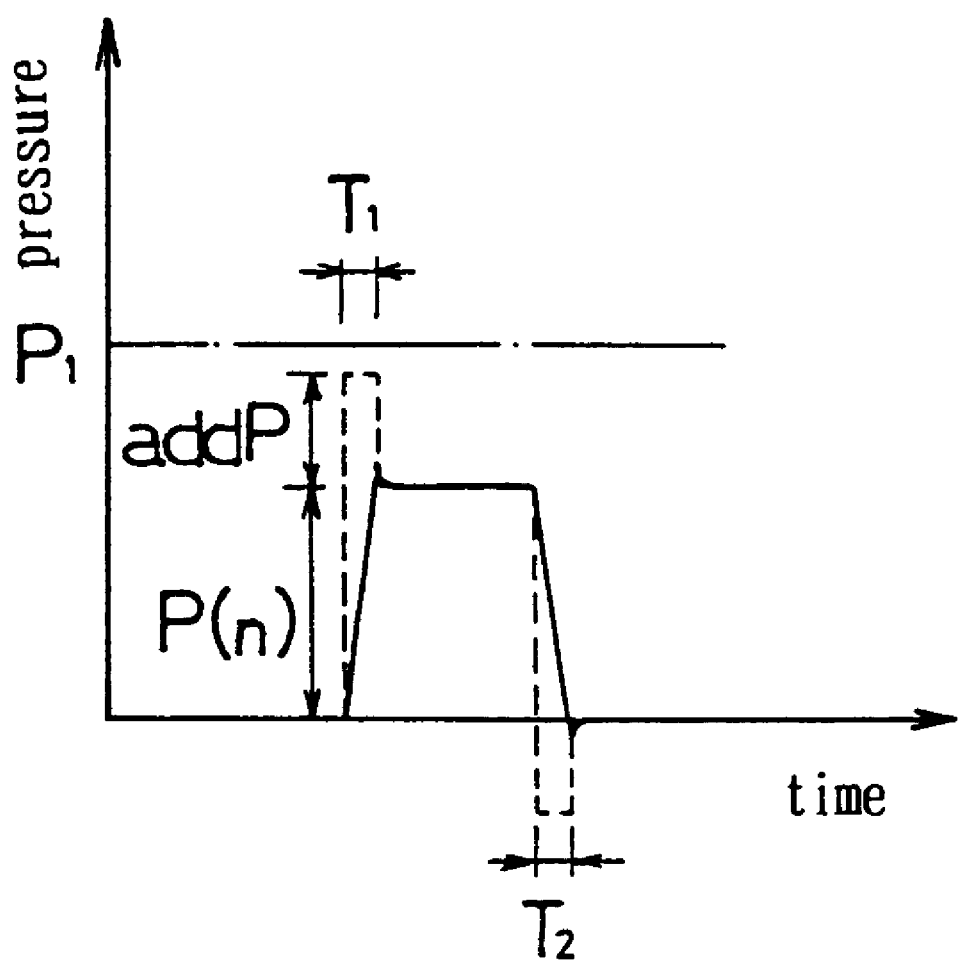
FIG. 3 is a graph showing how the fluid pressure is controlled according to the method of this invention.

In this way, good responsiveness of control is achieved in the low-pressure region below P1 with the actual pressure P approaching the target pressure P(n), as shown in FIG. 3.

Figure 6B:
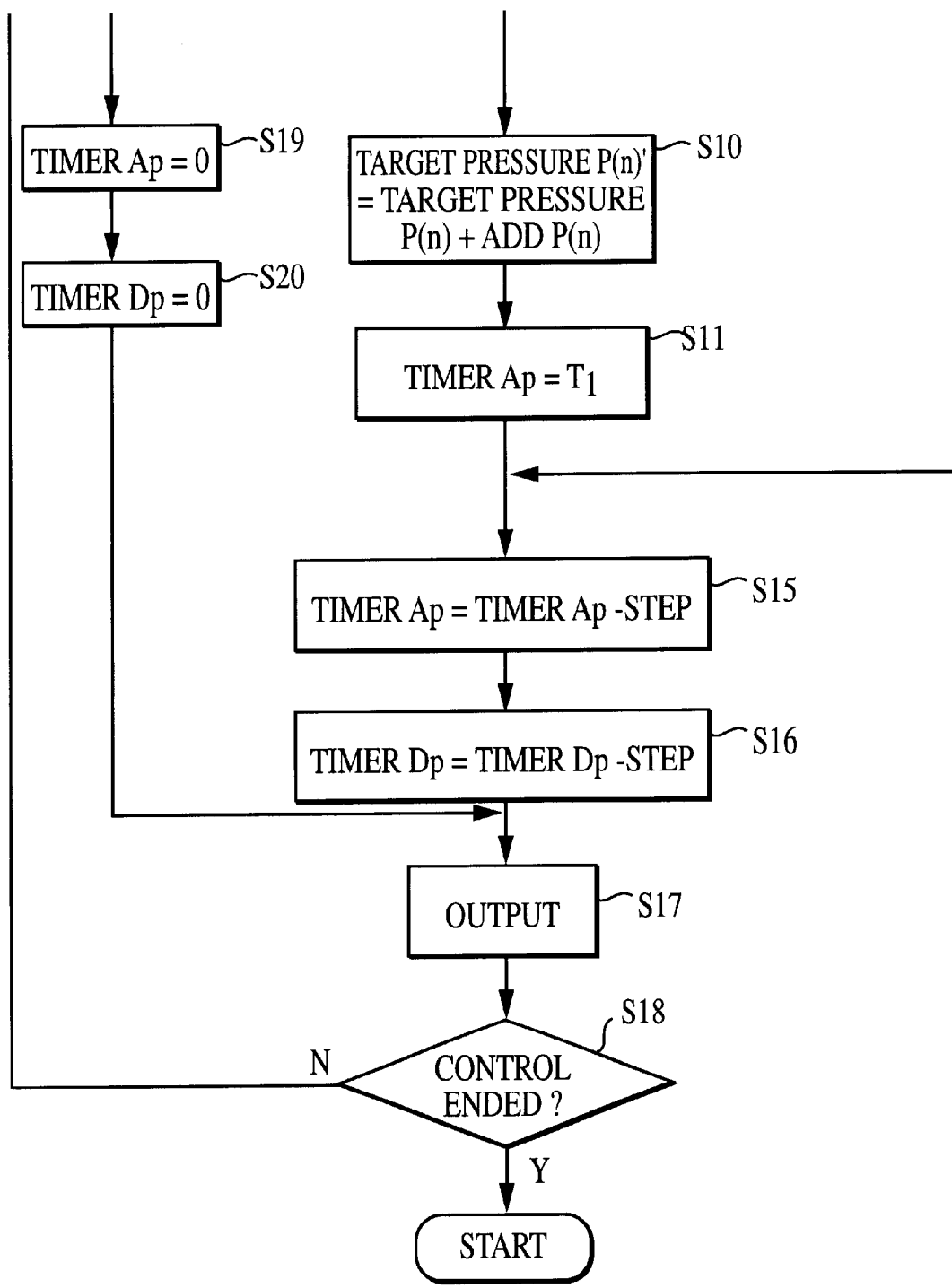
Figure 7B:
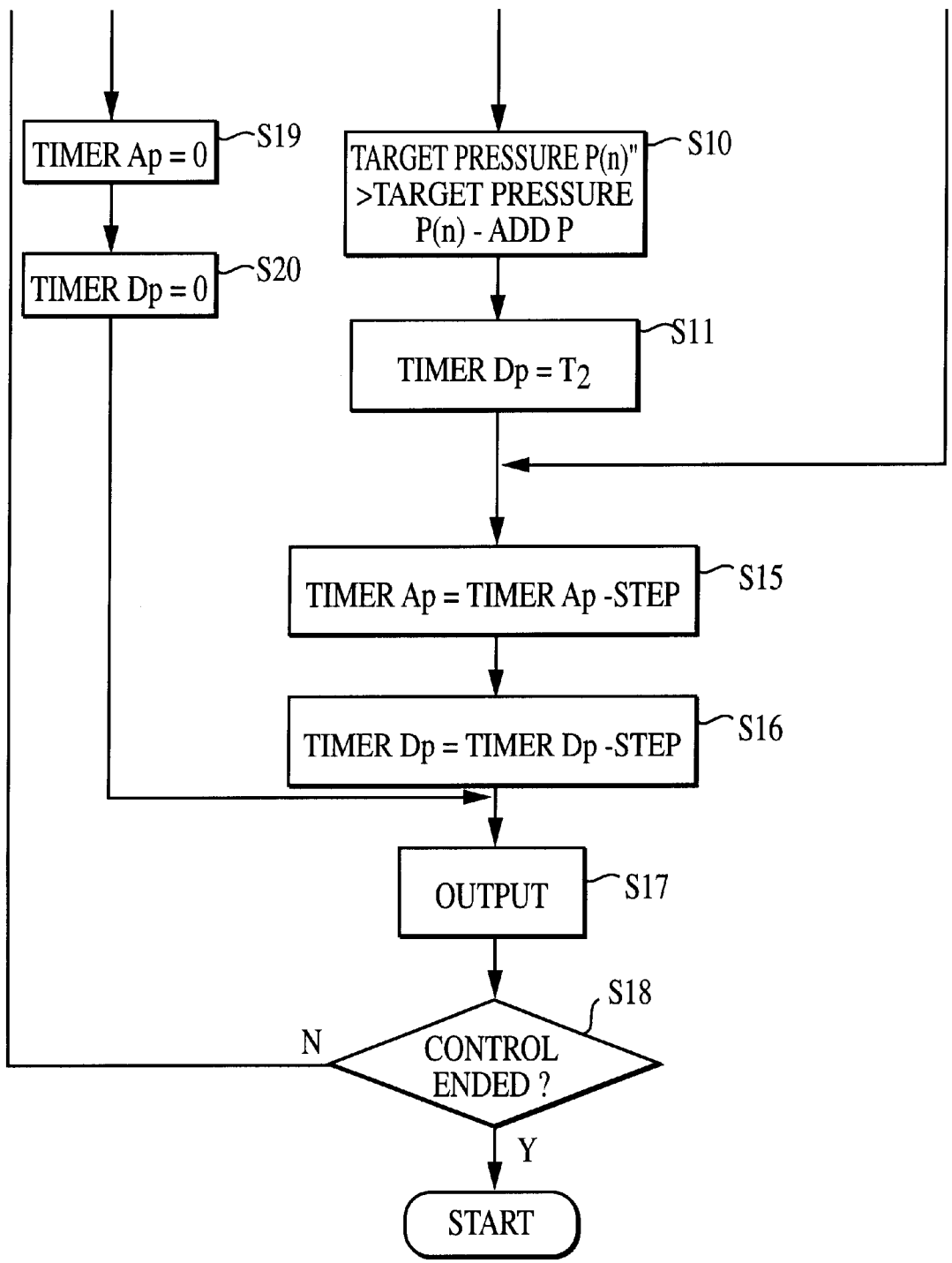

FIG. 6 shows a control algorism when only overshoot control is carried out. Steps S12, S13, S14 of FIG. 5 are omitted in this figure. FIG. 7 shows a control algorism for carrying out only undershoot control. Steps S9, S10 and S11 of FIG. 5 are not included. During antilock control for evading wheel lockup, quickness in pressure reduction is important. During traction control for preventing the wheel spin, it is important to increase pressure quickly. Thus, by carrying out one of the undershoot and overshoot controls as in FIGS. 6 and 7, it is possible to operate the brakes with higher reliability.

Figure 9:
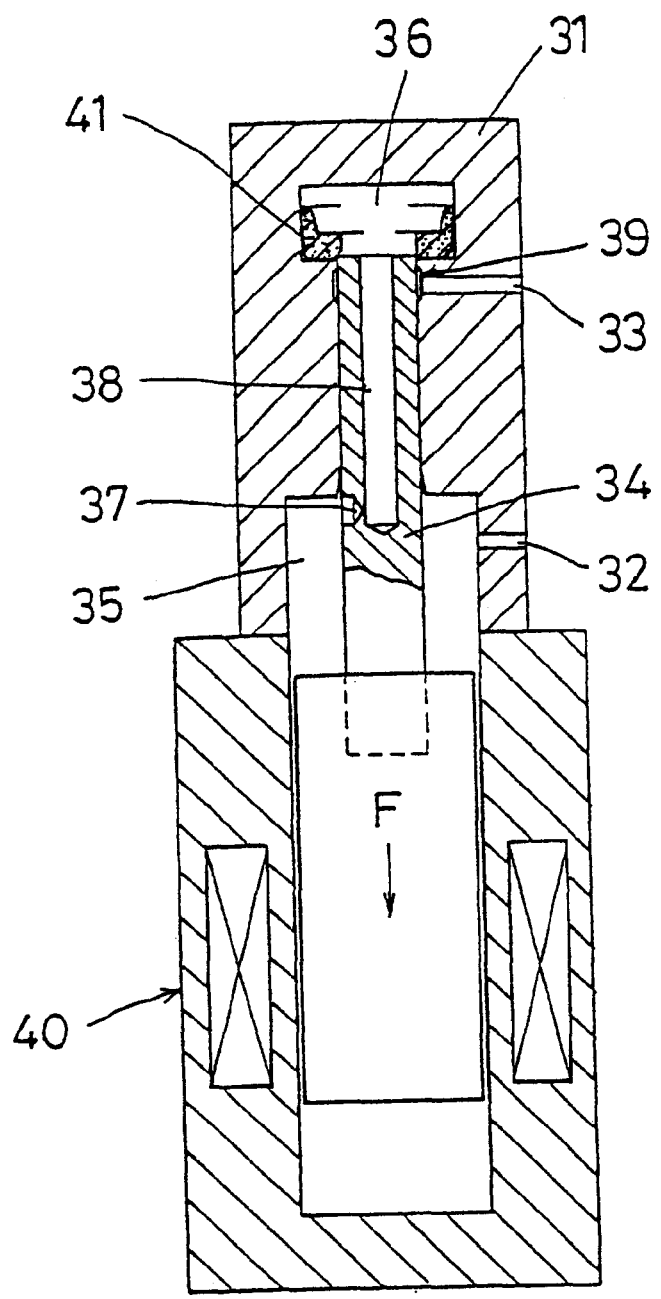
FIG. 9 is a sectional view of a flow control control valve used in the brake system of FIG. 8.

FIG. 8 shows an example of an automotive brake system including a flow control valve 30. The flow control valve 30 used has a structure as shown in FIG. 9. It comprises a housing 31 having an inlet port 32 and an outlet port 33, and a spool 34 substantially liquid-tightly and slidably inserted in the housing 31. Defined at one and the other end of the spool 34 are a first fluid chamber 35 and a second fluid chamber 36 communicated with each other by a fluid passage 38 with an orifice 37. The fluid passage 38 shown is formed in the spool 34 but such a passage may be formed in the housing 31 instead. Numeral 39 in the figure indicates a valve portion comprising a shoulder portion formed on the inner periphery of the housing 31 and a shoulder portion formed on the outer periphery of the spool 34. The shoulder portions are moved into and out of sliding contact with each other, thereby forming and stopping a fluid flow from the inlet port 32 to the outlet port 33 through the orifice 37. Also provided are a spool-driving electromagnet 40 and an annular seal provided (optionally) to reduce fluid leakage through a clearance of the valve portion that allows sliding movement of the spool.

When the thrust applied to the spool 34 due to the difference in fluid pressure between the first and second fluid chambers 35 and 36 balances with the force of the drive means (electromagnetic force of the electromagnet in the embodiment shown) that is opposite in direction to the thrust applied to the spool, fluid flows through the orifice 37 to the outlet port 33 at a rate determined by the abovementioned pressure difference and the sectional area of the orifice 37.

In the brake system of FIG. 8, two such flow control valves 30 are used for each wheel. The pump 24 is connected to the second fluid chamber 23d of the shutoff valve 23 through one of the valves 30, while the second fluid chamber 23d of the shutoff valve 23 is connected to the reservoir 25 through the other valve 30. An electronic control unit (not shown) controls the two shutoff valves 30 to control, i.e. increase and reduce, the presure in the wheel cylinder 22. To increase the pressure in the wheel cylinder 22, the flow control valve 30 on the inlet side (near the pump 24) is opened, while the flow control valve 30 on the discharge side (near the reservoir 25) is closed. For pressure reduction, the flow control valve 30 on the inlet side is closed and the flow control valve 30 on the discharge side is opened.

The brake system of FIG. 8 has also the problem concerning the responsiveness of pressure increase and reduction. That is, if there exists a pressure region where a greater amount of fluid is consumed than in other pressure regions, it is difficult to increase or reduce pressure with sufficient quickness in such a region. Thus in such a case, overshoot or undershoot control is carried out based on the control algorism shown in any of FIGS. 5–7.

According to the method of the present invention, in the pressure region where the consumption of fluid is greater than in other pressure regions, overshooting pressure increase control or undershooting pressure reduction control is carried out. This improves the otherwise bad responsiveness of control of a proportional pressure control valve or a kind of proportional flow control valve in the pressure region where the consumption of fluid is large and thus improves the reliability of pressure control.

The above description has been made for the control of an automotive brake fluid pressure. But the method of this invention is applicable to the control of fluid pressure on loads other than brakes.

What is claimed is:

1. A method of controlling a fluid pressure applied to a load by a proportional pressure control valve comprising a housing having a first port connected to a fluid pressure source, a second port connected to the load, and a third port connected to a reservoir, a spool mounted in the housing and having a plurality of pressure receiving portions, each of the plurality of pressure receiving portions having a different area, a driver biasing the spool, a first valve portion for opening and cutting off communication between the second port and the first port, and a second valve portion for opening and cutting off communication between the second port and the third port, the first and second valve portions being formed between the housing and the spool, the method comprising:

moving the spool to a balancing point where the driving force by the driver is balanced against a thrust applied to the spool, the thrust being produced by a difference between a first pressure received at a first one of the plurality of pressure receiving portions and a second pressure received at a second one of the plurality of pressure receiving portions, the first pressure and the second pressure being exerted in opposite directions, so that a communication between the second port and one of the first port and the third port changes with the movement of the spool;

adjusting the degrees of opening of the first and second valve portions with the movement of the spool such that the pressure at the second port is controlled depending on the driving force of the driver;

determining whether a target pressure is in a predetermined low pressure region, which requires a large consumption of fluid; and if the target pressure is in the predetermined low pressure region, increasing the fluid pressure in the low pressure region by adding a predetermined overshoot pressure to the target pressure for a predetermined time so that the fluid pressure is controlled to a slightly higher pressure than the target pressure during the predetermined time.

2. A method of controlling a fluid pressure applied to a load by a proportional pressure control valve comprising a housing having a first port connected to a fluid pressure source, a second port connected to the load, and a third port connected to a reservoir, a spool mounted in the housing and having a plurality of pressure receiving portions, each of the plurality of pressure receiving portions having a different area, a driver biasing the spool, a first valve portion for opening and cutting off communication between the second port and the first port, and a second valve portion for opening and cutting off communication between the second port and the third port, the first and second valve portions being formed between the housing and the spool, the method comprising:

moving the spool to a balancing point where the driving force by the driver is balanced against a thrust applied to the spool, the thrust being produced by a difference between a first pressure received at a first one of the plurality of pressure receiving portions and a second pressure received at a second one of the plurality of pressure receiving portions, the first pressure and the second pressure being exerted in opposite directions, so that a communication between the second port and one of the first port and the third port changes with the movement of the spool;

adjusting the degrees of opening of the first and second valve portions with the movement of the spool such that the pressure at the second port is controlled depending on the driving force of the driver;

determining whether a target pressure is in a predetermined low pressure region, which requires a large consumption of fluid; and if the target pressure is in the predetermined low pressure region, reducing the fluid pressure in the pressure region by subtracting a predetermined pressure from a target pressure for a predetermined time so that the fluid pressure is controlled to a lower pressure than the target pressure during the predetermined time.

3. A method of controlling a fluid pressure applied to a load by a proportional pressure control valve comprising a housing having a plurality of inlet ports and an outlet port, a spool substantially liquid-tightly and slidably mounted in the housing so as to define a first fluid pressure chamber and a second fluid pressure chamber at opposite ends of the spool, the first and second fluid pressure chambers applying fluid pressure on the opposite ends of the spool and communicating with each other through a fluid passage having an orifice, a driver for biasing the spool, and a plurality of flow control valves, each of the plurality of flow control valves comprising a first shoulder portion formed on an inner periphery of the housing and a second shoulder portion formed on an outer periphery of the spool, the first and second shoulder portions being movable into and out of sliding contact with each other to start and stop a fluid flow from one of the plurality of inlet ports to the outlet port through the orifice, the method comprising:

moving the spool to a balancing point where a thrust applied to the spool due to a difference in pressure between the first and second fluid pressure chambers balances with a force of the driver, a direction of the thrust being opposite to a direction of the force of the driver, such that the fluid flows through the orifice toward the outlet port at a rate determined by the difference in fluid pressure and a cross-sectional area of the orifice;

connecting the load to a fluid pressure source through a first one of the plurality of flow control valves and to a reservoir through a second one of the plurality of flow control valves;

determining whether a target pressure is in a predetermined low pressure region, which requires a large consumption of fluid; and if the target pressure is in the predetermined low pressure region, increasing the fluid pressure in the low pressure region by adding a predetermined pressure to the target pressure for a predetermined time so that the fluid pressure is controlled to a slightly higher pressure than the target pressure during the predetermined time.

4. A method of controlling a fluid pressure applied to a load by a proportional pressure control valve comprising a housing having a plurality of inlet ports and an outlet port, a spool substantially liquid-tightly and slidably mounted in the housing so as to define a first fluid pressure chamber and a second fluid pressure chamber at opposite ends of the spool, the first and second fluid pressure chambers applying fluid pressure on the opposite ends of the spool and communicating with each other through a fluid passage having an orifice, a driver for biasing the spool, and a plurality of flow control valves, each of the plurality of flow control valves comprising a first shoulder portion formed on an inner periphery of the housing and a second shoulder portion formed on an outer periphery of the spool, the first and second shoulder portions being movable into and out of sliding contact with each other to start and stop a fluid flow from one of the plurality of inlet ports to the outlet port through the orifice, the method comprising:

moving the spool to a balancing point where a thrust applied to the spool due to a difference in pressure between the first and second fluid pressure chambers balances with a force of the driver, a direction of the thrust being opposite to a direction of the force of the driver, such that the fluid flows through the orifice toward the outlet port at a rate determined by the difference in fluid pressure and a cross-sectional area of the orifice;

connecting the load to a fluid pressure source through a first one of the plurality of flow control valves and to a reservoir through a second one of the plurality of flow control valves;

determining whether a target pressure is in a predetermined low pressure region, which requires a large consumption of fluid; and if the target pressure is in the predetermined low pressure region, reducing the fluid pressure in the low pressure region by subtracting a predetermined pressure from the target pressure for a predetermined time so that the fluid pressure is controlled to a slightly higher pressure than the target pressure during the predetermined time.

5. An apparatus for controlling a fluid pressure applied to a load comprising:

a housing, defining a first port connected to a fluid pressure source, a second port connected to the load, and a third port connected to a reservoir;

a spool, mounted in said housing, said spool comprising a plurality of pressure receiving portions, each of the plurality of pressure receiving portions having a different area;

a driver biasing said spool;

a first valve portion, formed between said housing and said spool, which opens and closes a communication between the second port and the first port; and a second valve portion, formed between said housing and said spool, which opens and closes a communication between the second port and the third port;

wherein said spool is moved to a balancing point at which a driving force exerted by said driver is balanced against a thrust created by a difference in pressure between at least two of the plurality of fluid pressure receiving portions, so that at least one of the communication between the second port and the first port and the communication between the second port and the third port changes with the movement of said spool;

wherein an opening of said first valve portion and an opening of said second valve portion are adjusted with the movement of said spool, such that a pressure at the second port is controlled by the driving force of said driver; and wherein, if a target fluid pressure is determined to be in a predetermined low pressure region requiring a large consumption of fluid, one of an overshoot control and an undershoot control is performed, the overshoot control comprising adding a predetermined pressure to the target fluid pressure for a predetermined time and the undershoot control comprising subtracting a predetermined pressure from the target pressure for a predetermined time.

6. An apparatus for controlling a fluid pressure of a fluid applied to a load comprising:

a housing, defining a plurality of inlet ports and at least one outlet port for the fluid;

a spool, substantially liquid-tightly and slidably mounted in said housing, said spool defining a first fluid pressure chamber and a second fluid pressure chamber at opposite ends of said spool, the first fluid pressure chamber and the second fluid pressure chamber communicating with each other through a fluid passage comprising an orifice;

a driver for biasing said spool;

a first fluid control valve connecting a fluid pressure source to the load, said first fluid control valve comprising a first shoulder portion formed on an inner periphery of said housing and a second shoulder portion formed on an outer periphery of said spool, the first shoulder portion and the second shoulder portion being movable into and out of sliding contact with each other to control a flow of the fluid from a first one of the plurality of inlet ports to the at least one outlet port through the orifice; and a second fluid control valve connecting a fluid reservoir to the load, said second fluid control valve comprising a third shoulder portion formed on an inner periphery of said housing and a fourth shoulder portion formed on an outer periphery of said spool, the third shoulder portion and the fourth shoulder portion being movable into and out of sliding contact with each other to control a flow of the fluid from a second one of the plurality of inlet ports to the at least one outlet port through the orifice;

wherein said spool is moved to a balancing point, at which a thrust, produced by a difference in a first fluid pressure of the first fluid pressure chamber and a second fluid pressure of the second fluid pressure chamber, balances against a force of said driver, such that the system fluid flows through the orifice at a rate determined by the thrust and by a cross-sectional area of the orifice; and wherein, if a target fluid pressure is determined to be in a predetermined low pressure region requiring a large consumption of fluid, one of an overshoot control and an undershoot control is performed, the overshoot control comprising adding a predetermined pressure to the target fluid pressure for a predetermined time and the undershoot control comprising subtracting a predetermined pressure from the target pressure for a predetermined time.

\* \* \* \* \*

UNITED STATES PATENT AND TRADEMARK OFFICE
CERTIFICATE OF CORRECTION

PATENT NO. : 6,247,765 B1
DATED : June 19, 2001
INVENTOR(S) : H. Oyama

It is certified that error appears in the above-identified patent and that said Letters Patent is hereby corrected as shown below:

Title page,
Item [57], Abstract, line 16, after "large" insert -- , and thus to improve responsiveness of control --.

Signed and Sealed this

Eleventh Day of December, 2001

Attest:

NICHOLAS P. GODICI
Attesting Officer    Acting Director of the United States Patent and Trademark Office